Aug. 29, 1972 J. P. TAILOR 3,687,630
GAS CLEANING PROCESS
Filed July 24, 1968 3 Sheets-Sheet 2

INVENTOR
JOHN P. TAILOR
BY Wynne & Finken
ATTORNEYS

# United States Patent Office 3,687,630
Patented Aug. 29, 1972

3,687,630
GAS CLEANING PROCESS
John P. Tailor, P.O. Box 587,
Davenport, Iowa 52805
Filed July 24, 1968, Ser. No. 747,266
Int. Cl. B01d 53/34
U.S. Cl. 423—242
7 Claims

ABSTRACT OF THE DISCLOSURE

Sulfur oxides and fly ash are removed from combustion gases employing a two stage scrubber-absorption system. In the first stage inwardly swirling contaminated gas is passed through a downwardly flowing film of washing liquid on each side of a cylindrical perforate baffle. In the second stage the swirling gas is passed inwardly through two films of absorbent liquid flowing downwardly on the outside of a cylindrical perforate baffle and on the inside of a concentric perforate baffle within the first baffle. Elemental sulfur or sulfur compounds may be recovered in the process.

This invention relates to a process for removing sulfur oxides and fly ash from combustion gases.

BACKGROUND OF THE INVENTION

It is known that the combustion gases from coal-burning power plants contain sulfur dioxide, sulfur trioxide and fly ash and that the discharge of such gases into the atmosphere is a serious and substantial cause of air pollution.

It is an object of this invention to economically remove the pollutants from combustion gases and further to recover sulfur and or sulfur compounds in usable form. Other objects and advantages will be apparent from the description herein.

SUMMARY OF THE INVENTION

The process of the invention comprises a two-stage separation process utilizing the scrubber apparatus of U.S. Pat. 3,050,919 and Tailor application Ser. No. 530,616, filed Feb. 28, 1966, both of which are incorporated herein by reference.

Figure 1:
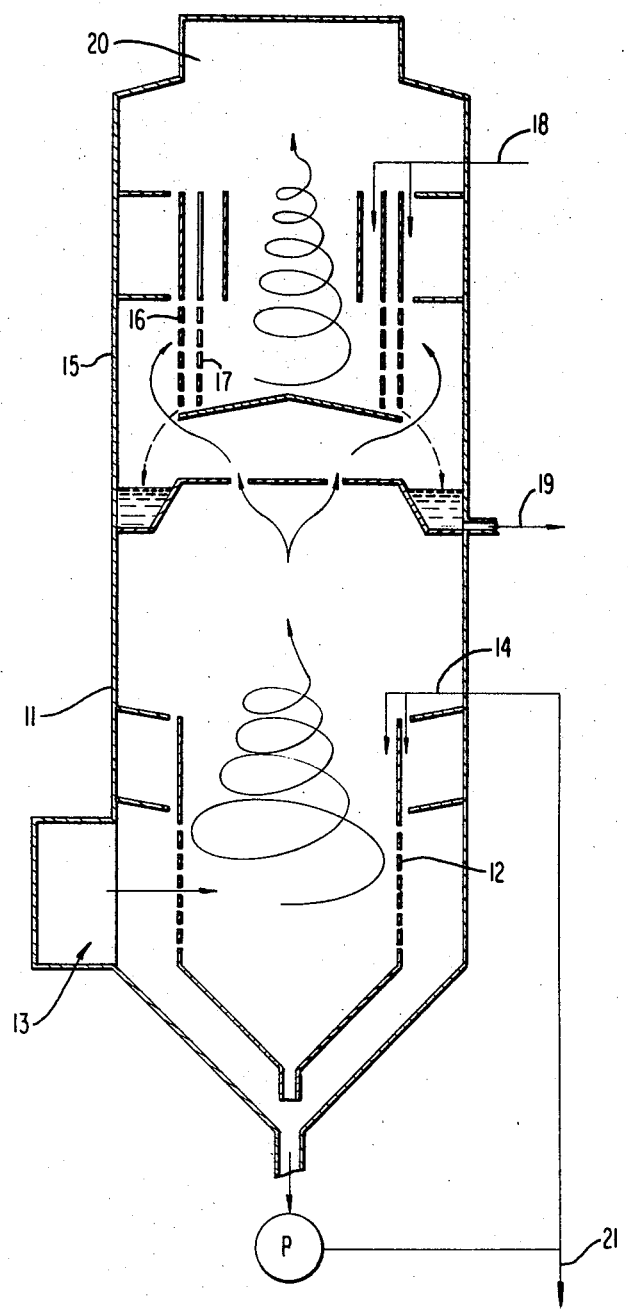
FIG. 1 is a partly schematic cross-section of the two stage scrubber employed in the process, some of the liquid flow lines being shown schematically.

Referring to FIG. 1, lower section 11 comprises a scrubber of the type disclosed in Patent 3,050,919, having a single perforate annular cylindrical baffle. The tangential contaminated gas inlet is shown at 13. Fluid connections for providing a film of liquid on both sides of the perforated annular baffle is shown schematically at 14.

In the first section 11 of the dual scrubber, substantially all of the solids, fly ash, are removed. Similarly all of the sulfur trioxide is removed, and depending on the temperature of the scrubbing water, up to forty percent of the sulfur dioxide content is removed.

The swirling gases are then brought into the second stage 15 which is a scrubber of the type disclosed in Tailor Ser. No. 530,616, having a pair of concentric perforate annular baffles 16 and 17. Fluid connections for supplying films of liquid to the outside of the outer perforate baffle and to the inside of the inner baffle are shown schematically at 18. Substantially all the remaining sulfur dioxide is absorbed in the second stage 15 and the solution is removed at 19. The clean gas is exhausted at 20 to a stack, not shown. Fly ash slurry is removed at 21 from a cyclone separator, not shown.

Figure 2:
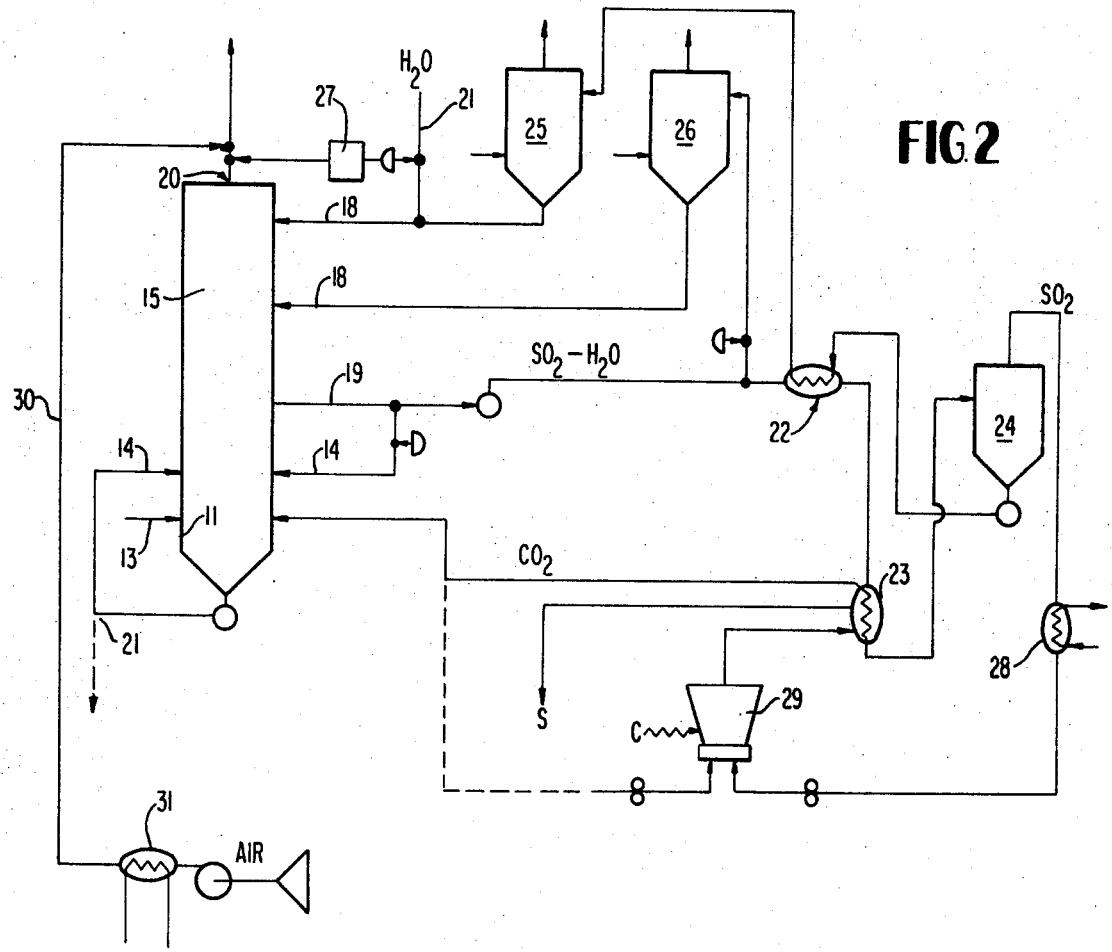
FIG. 2 is a schematic flow diagram of the preferred embodiment of the process and which recovers elemental sulfur.
Figure 3:
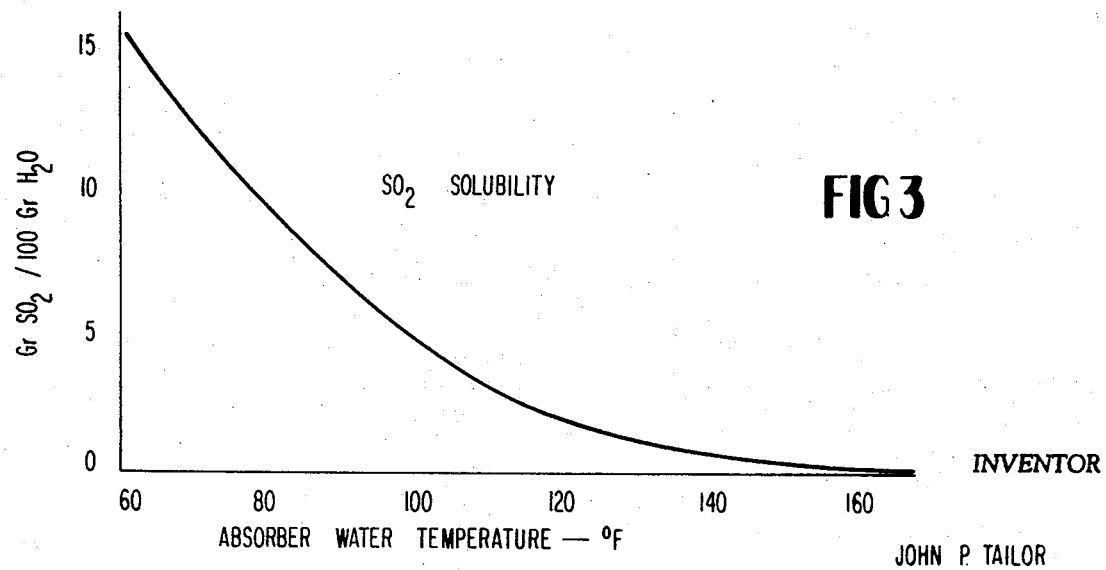
FIG. 3 is a curve showing the solubility of sulfur dioxide in water at varying temperatures.
Figure 4:
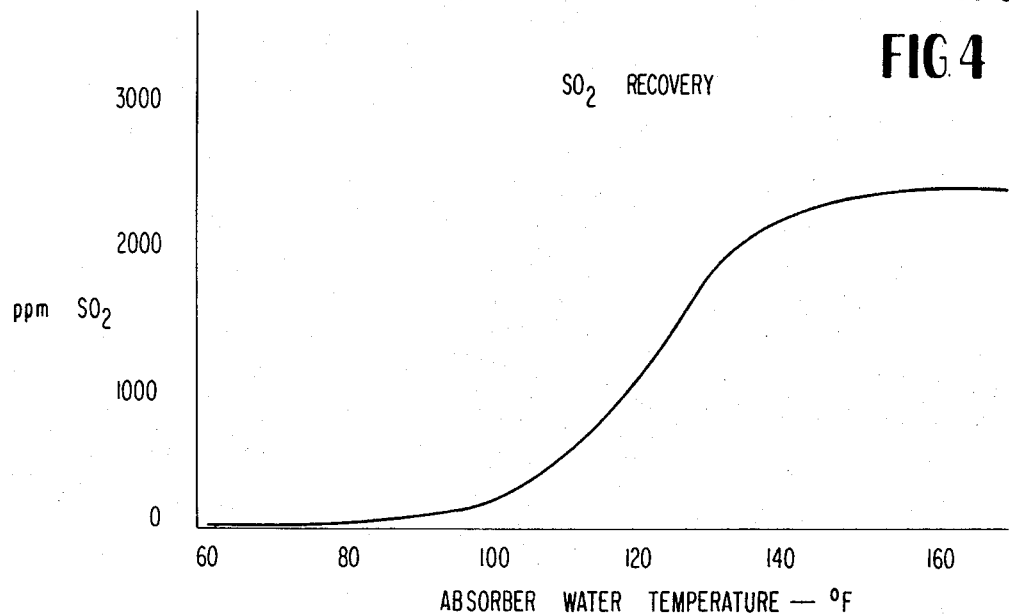
FIG. 4 is a curve showing the sulfur dioxide content of effluent gases versus scrubbing water temperature.

Referring to FIG. 2, the combustion gases, at a temperature of about 280° F. to 400° F. after leaving the economizer, not shown, are first quenched with water (not shown) to reduce the temperature to about 110–130° F. The gases are then admitted to scrubber 11 at 13. Scrubbing water is admitted at 14 onto the perforated baffle of scrubber 11. The scrubbing water may be made up in part of recycle from the fly ash separation step and also in part by recycling a portion of the sulfur dioxide containing solution from the fly ash separation step and also in part by recycling a portion of the sulfur dioxide containing solution from the second stage, as at 19, as well as make up water. Make up water for the second stage absorber is provided at 21. A portion of the sulfur dioxide solution from absorber 15 is heated at 22 and 23 to about 240° F., pressurized and flashed at 24 to yield relatively pure sulfur dioxide. The denuded water from the flash separator 24 is cooled at 22 and is further cooled by evaporation at 25 for recycle to the absorber. The remainder of the sulfur dioxide solution from the absorber, at a temperature of about 100° F. is cooled by evaporation at 26 and recycled back to the absorber. It has been found that maintenance of 80° F. water delivered to the absorber 15 results in a sulfur dioxide content of about 20 p.p.m. in the stack gas. At 60° F. the content is reduced to about 5–6 p.p.m. See FIG. 4. In operation about twenty percent of the sulfur dioxide solution is bled off for recovery of sulfur dioxide and eighty percent is recycled after being cooled.

Thus, through the use of high internal recycling rates, the concentration of sulfur dioxide can be increased to the point where the regeneration step is economically operated at lower rates.

In FIG. 2, 27 indicates a monitoring control on the sulfur dioxide content of the outgoing gases. Through conventional control equipment the recycle and make-up water rates can thereby be adjusted to yield a minimum sulfur dioxide content.

After the sulfur dioxide has been flashed off at 24 it can be cooled at 28, dried if necessary (not shown) and reacted with carbon in a fluid bed at 29, in known fashion, to produce sulfur. The carbon dioxide may be recycled to the scrubber 11 or a portion may be returned to the reactor 29 to serve as fluidizing gas. Alternatively, the recovered sulfur dioxide may be converted to sulfuric acid according to well known methods.

Figure 5:
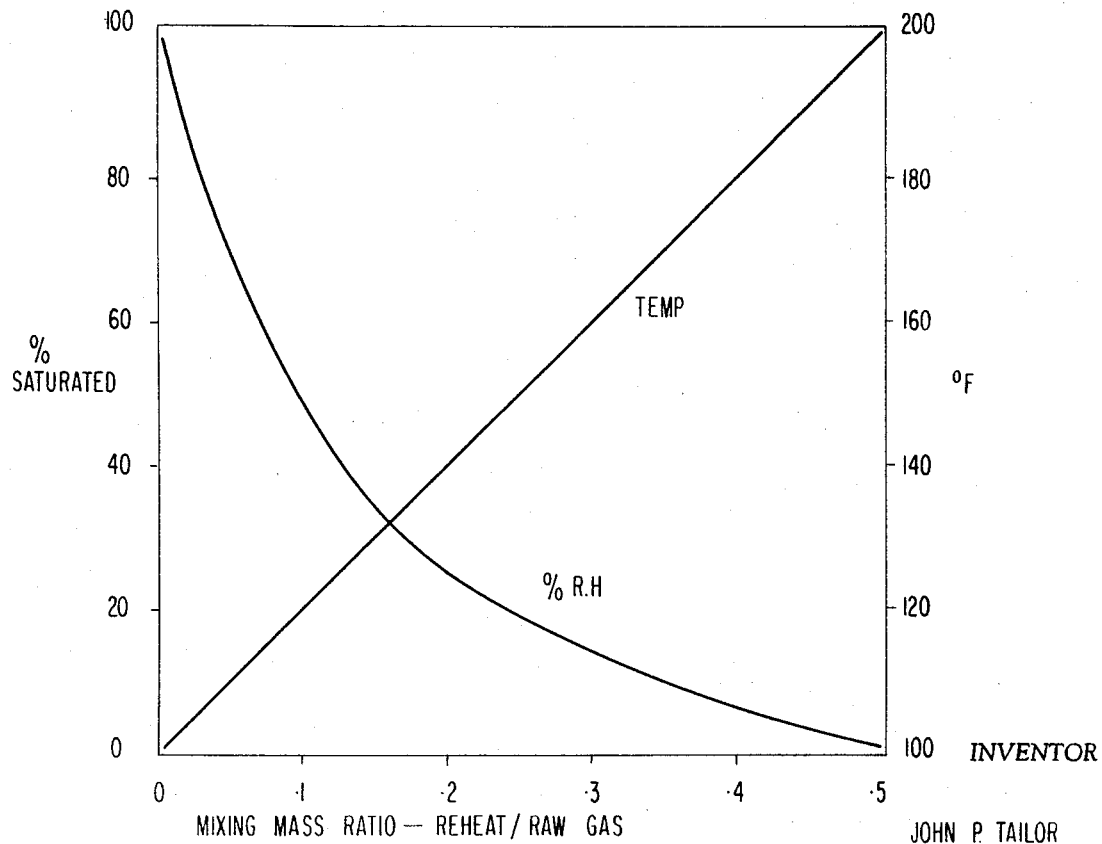
FIG. 5 is a curve showing the amount of heated gas which might be necessary to add to the scrubbed combustion gas to obtain buoyancy in the event of an atmospheric inversion layer.

Under certain weather conditions involving an atmospheric inversion layer, the gases emanating from the stack may not have sufficient buoyancy to be effectively dissipated in the atmosphere. To overcome this, the scrubbed gases may be mixed with heated air via line 30, 31 indicating a steam coil to preheat the air. The curves for determining the ratio and air temperature are shown in FIG. 5. In general, the reheat principle need only be used infrequently when atmospheric conditions demand it.

Thus, the present process provides an economical system for removing sulfur dioxide and fly ash from combustion gases, requiring only low energy requirements because of low pressure drop in the scrubber and absorber sections. Further, sulfur or compounds thereof may be recovered to effect further economies. The fly ash combines chemically with sulfur dioxide and trioxide and is disposed of as waste. While the preferred scrubbing liquid and absorbent is water for reasons of economy, the process contemplates the use of other known absorbents for acidic gases.

The process has proved to be highly effective in reducing atmospheric pollution from combustion gases. Depending on the sulfur content of coal used in power generating plants, the combustion gases contain on the order of 2,000 to 3,000 p.p.m. of sulfur dioxide plus objectionable ky ash. According to the present process the fly ash is completely eliminated and the sulfur dioxide content is consistently reduced to 20 p.p.m. or less.

While the invention has been described in terms of certain preferred embodiments, they are to be deemed illustrative and it is intended to cover all modifications that fall within the spirit and scope of the appended claims.

I claim:

1. A process for removing fly ash and sulfur oxides from combustion gases comprising the steps of:
   passing contaminated gas in an inwardly spiraling stream through a downwardly flowing annular film of scrubbing liquid to remove fly ash and a portion of the sulfur oxides contained in said gas, and
   passing the thus scrubbed gas in an inwardly spiraling stream through two downwardly flowing annular films of absorbing liquid to remove substantially all the remaining sulfur oxides.

2. The process of claim 1 wherein both said scrubbing liquid and absorbing liquid are water.

3. The process of claim 2 wherein the temperature of the absorbing water is initially in the range of 60–80° F.

4. The process of claim 3 wherein the final temperature of the absorbing water is at a temperature of about 100° F. and a portion of said water is cooled to 60–80° F. and recycled to the absorbing step.

5. The process of claim 4 wherein a second portion of the water at about 100° F. is heated to drive off sulfur oxides, cooled to 60–80° F. and recycled to the absorbing step.

6. The process of claim 1 wherein the fly ash is removed from the scrubbing liquid and the liquid recycled to the scrubbing step.

7. The process of claim 1 wherein the sulfur oxides removed in the absorbing step are reduced to elemental sulfur.

References Cited

UNITED STATES PATENTS

| | | | |
|---|---|---|---|
| 2,082,006 | 6/1937 | Johnstone | 23—2 X |
| 2,890,929 | 6/1959 | Rummert | 23—1 |
| 3,285,711 | 11/1966 | Stanford | 23—2 X |
| 3,395,990 | 8/1968 | Ballestra | 23—1 X |

OTHER REFERENCES

British Ministry of Transport Publication "Treatment of Sulphur Fumes in Connection with the Working of the Proposed Electric Power Station of the London Power Company at Battersea," H. M. Stationery Office; London; 1929, pp. 1–6.

Perry, J. H.: Chemical Engineer's Handbook; 4th Edition; McGraw-Hill Book Co., N.Y., pp. 18-53-55.

OSCAR R. VERTIZ, Primary Examiner

G. O. PETERS, Assistant Examiner

U.S. Cl. X.R.

423—539